US011220173B2

(12) United States Patent
Burtov et al.

(10) Patent No.: US 11,220,173 B2
(45) Date of Patent: Jan. 11, 2022

(54) POWERED WHEEL ASSEMBLIES AND CONTROL SYSTEMS

(71) Applicant: GeoOrbital Inc., Swampscott, MA (US)

(72) Inventors: Michael Burtov, Swampscott, MA (US); Dakota Decker, Somerville, MA (US)

(73) Assignee: GeoOrbital Inc., Swampscott, MA (US)

( * ) Notice: Subject to any disclaimer, the term of this patent is extended or adjusted under 35 U.S.C. 154(b) by 883 days.

(21) Appl. No.: 15/757,322

(22) PCT Filed: Sep. 1, 2016

(86) PCT No.: PCT/US2016/049943
§ 371 (c)(1),
(2) Date: Mar. 2, 2018

(87) PCT Pub. No.: WO2017/040811
PCT Pub. Date: Mar. 9, 2017

(65) Prior Publication Data
US 2019/0070949 A1 Mar. 7, 2019

Related U.S. Application Data

(63) Continuation of application No. 14/843,706, filed on Sep. 2, 2015, now Pat. No. 10,076,954.
(Continued)

(51) Int. Cl.
*B62M 6/60* (2010.01)
*B60K 7/00* (2006.01)
(Continued)

(52) U.S. Cl.
CPC .............. *B60K 7/0007* (2013.01); *B60K 1/02* (2013.01); *B60K 1/04* (2013.01); *B60K 26/02* (2013.01);
(Continued)

(58) Field of Classification Search
CPC ...... B60K 2001/045; B60K 2007/0061; B60K 7/0007; B60L 2220/44; B60L 2220/46; B62M 6/40; B62M 6/60; B62M 6/75
See application file for complete search history.

(56) References Cited

U.S. PATENT DOCUMENTS 3,260,324 A * 7/1966 Suarez ..................... B62K 1/00
180/10
4,163,567 A 8/1979 Barber
(Continued)

FOREIGN PATENT DOCUMENTS

CN 102275621.1 12/2011
JP 2000-095177 4/2000
(Continued)

OTHER PUBLICATIONS

Communication pursuant to Rules 70(2) and 70a(2) EPC and Extended European Search Report for EP Application No. 16842994.2, dated Mar. 22, 2019.
(Continued)

*Primary Examiner* — Jeffrey J Restifo
(74) *Attorney, Agent, or Firm* — Foley & Lardner LLP

(57) ABSTRACT

Powered wheel assemblies and methods of manufacturing and operating such assemblies are provided.

17 Claims, 8 Drawing Sheets

Related U.S. Application Data

(60) Provisional application No. 62/077,491, filed on Nov. 10, 2014, provisional application No. 62/045,368, filed on Sep. 3, 2014.

(51) Int. Cl.
| | |
|---|---|
| *B60K 1/02* | (2006.01) |
| *B62M 6/75* | (2010.01) |
| *B60K 1/04* | (2019.01) |
| *B62L 1/00* | (2006.01) |
| *B62K 25/00* | (2006.01) |
| *B60K 26/02* | (2006.01) |
| *B62K 11/00* | (2006.01) |

(52) U.S. Cl.
CPC ............ *B62K 25/00* (2013.01); *B62L 1/00* (2013.01); *B62M 6/60* (2013.01); *B62M 6/75* (2013.01); *B60K 2001/045* (2013.01); *B60K 2007/0038* (2013.01); *B60K 2007/0061* (2013.01); *B60K 2026/025* (2013.01); *B60K 2026/028* (2013.01); *B60Y 2200/13* (2013.01); *B60Y 2400/304* (2013.01); *B60Y 2400/306* (2013.01); *B60Y 2400/307* (2013.01); *B62K 11/00* (2013.01)

(56) References Cited

U.S. PATENT DOCUMENTS

| | | | | |
|---|---|---|---|---|
| 4,241,931 | A | * | 12/1980 | Healy .................. B62K 1/00 280/205 |
| 5,826,674 | A | * | 10/1998 | Taylor .................. A63C 17/12 180/219 |
| 7,014,272 | B1 | | 3/2006 | Williamson et al. |
| 7,828,101 | B2 | | 11/2010 | Radtke et al. |
| 7,992,948 | B2 | | 8/2011 | Swain et al. |
| 8,123,237 | B2 | | 2/2012 | Takemura |
| RE43,232 | E | | 3/2012 | Pyntikov et al. |
| 8,151,924 | B2 | | 4/2012 | Radtke |
| 8,538,615 | B2 | | 9/2013 | Chen et al. |
| 9,073,601 | B2 | | 7/2015 | Carolin |
| 9,085,334 | B2 | * | 7/2015 | Hoffmann ............ B60L 7/12 |
| 9,567,034 | B2 | | 2/2017 | Sirbu |
| 9,777,774 | B2 | | 10/2017 | Biechele |
| 10,076,954 | B2 | * | 9/2018 | Burtov .................. B62L 1/00 |
| 10,093,168 | B2 | * | 10/2018 | Hays .................... B60B 1/00 |
| 10,492,964 | B2 | * | 12/2019 | Hays .................. B60K 7/0007 |
| 2005/0067207 | A1 | | 3/2005 | Radtke et al. |
| 2013/0225360 | A1 | | 8/2013 | Hirn |
| 2016/0011003 | A1 | | 1/2016 | Biderman et al. |

FOREIGN PATENT DOCUMENTS

| | | |
|---|---|---|
| JP | 2001-199379 A | 7/2001 |
| KR | 1020050031101 | 4/2005 |
| KR | 20-0384084 | 5/2005 |
| WO | WO-03/065963 A1 | 8/2003 |
| WO | WO-2008/067822 A2 | 6/2008 |

OTHER PUBLICATIONS

International Preliminary Report on Patentability for PCT/US2016/049943, dated Dec. 15, 2016.

International Search Report and Written Opinion for PCT/US2016/049943, dated Dec. 15, 2016.

U.S. Non-Final Office Action for U.S. Appl. No. 14/843,706, dated Nov. 16, 2017.

* cited by examiner

POWERED WHEEL ASSEMBLIES AND CONTROL SYSTEMS

RELATED APPLICATIONS

This U.S. national stage application claims the benefit of and priority to International Application No. PCT/US2016/049943, filed Sep. 1, 2016, titled "POWERED WHEEL ASSEMBLIES AND CONTROL SYSTEMS," which claims the benefit of and priority to U.S. patent application Ser. No. 14/843,706, filed Sep. 2, 2015, titled "SELF-POWERED PLANETARY ORBITAL WHEEL ASSEMBLIES," which claims the benefit of and priority to U.S. Provisional Application No. 62/077,491, filed Nov. 10, 2014, titled "POWERED WHEEL ASSEMBLIES," and to U.S. Provisional Application No. 62/045,368, filed Sep. 3, 2014, titled "POWERED WHEEL ASSEMBLIES." The contents of all of which are hereby incorporated herein by reference in its entirety for all purposes.

COPYRIGHT & TRADEMARK NOTICE

A portion of the disclosure of this patent document contains material that is subject to copyright protection. The copyright owner has no objection to the facsimile reproduction by any one of the patent document or the patent disclosure, as it appears in the files or records of any patent office in which the disclosure is filed, e.g., the U.S. Patent and Trademark Office, but otherwise reserves all copyrights whatsoever.

Certain marks referenced herein may be trademarks or registered trademarks of third parties. Use of these marks is solely for providing an enabling disclosure by way of example and is not to be construed as limiting the scope of implementation of this disclosure to material associated with such trademarks.

TECHNICAL FIELD

This disclosure relates to wheel assemblies. More specifically, the present disclosure relates to wheel assembly.

BACKGROUND

Bicycle transportation provides an efficient and cost effective mode of transportation, particularly within dense urban environments. However, some people desiring to commute from one location to another, for work, leisure, or other purposes, may be reluctant to do so in view of the physical exasperation that might be experienced and the associated discomfort associated with physical exertion required to efficiently and effectively traverse a desired route.

Some electric bicycles wheel assemblies have disadvantages associated with the requirement that electric power be provided to the bicycle via actuation at the sprocket of the bicycle. Such a requirement generally requires disassembly of the chain and sprocket assembly or complex integration within the sprocket and chain assembly.

SUMMARY

Various embodiments disclosed herein provide a wheel assembly and methods of manufacturing and operating a wheel assembly.

In view of the foregoing, wheel assembly embodiments disclosed herein provide a wheel that is significantly simplified, provides reduced failure points and thereby greatly reduces production costs. Additionally the wheel assembly embodiments disclosed herein allow the integration of storage space useable to house personal items, as well as emergency and other items including, but not limited to, medical kits, electronics, communication devices, lights, blinkers, horns and bicycle tools. The wheel disclosed can also be operated by a variety of user interfaces including but not limited to traditional thumb and twist throttle mechanisms as well as foot operated throttle mechanisms which are often referred to as "Pedal Assist," as well as being controlled by electronic devices including mobile phones, tablets, computers, radio controllers and others, including any combination of these.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive wheel assemblies. The following works from and expands upon the self-powered planetary orbital wheel assembly described in the U.S. Utility application Ser. No. 14/843,706. One aspect described herein includes additional sensors and features, including innovative combination thereof, that may be used to innovatively enhance and improve on the function of embodiments of this previous disclosure. It should be appreciated that various concepts introduced and discussed here may be implemented in any of numerous ways, as the disclosed concepts are not limited to any particular manner of implementation. Examples of specific implementations and applications are provided primarily for illustrative purposes.

Figure 1:
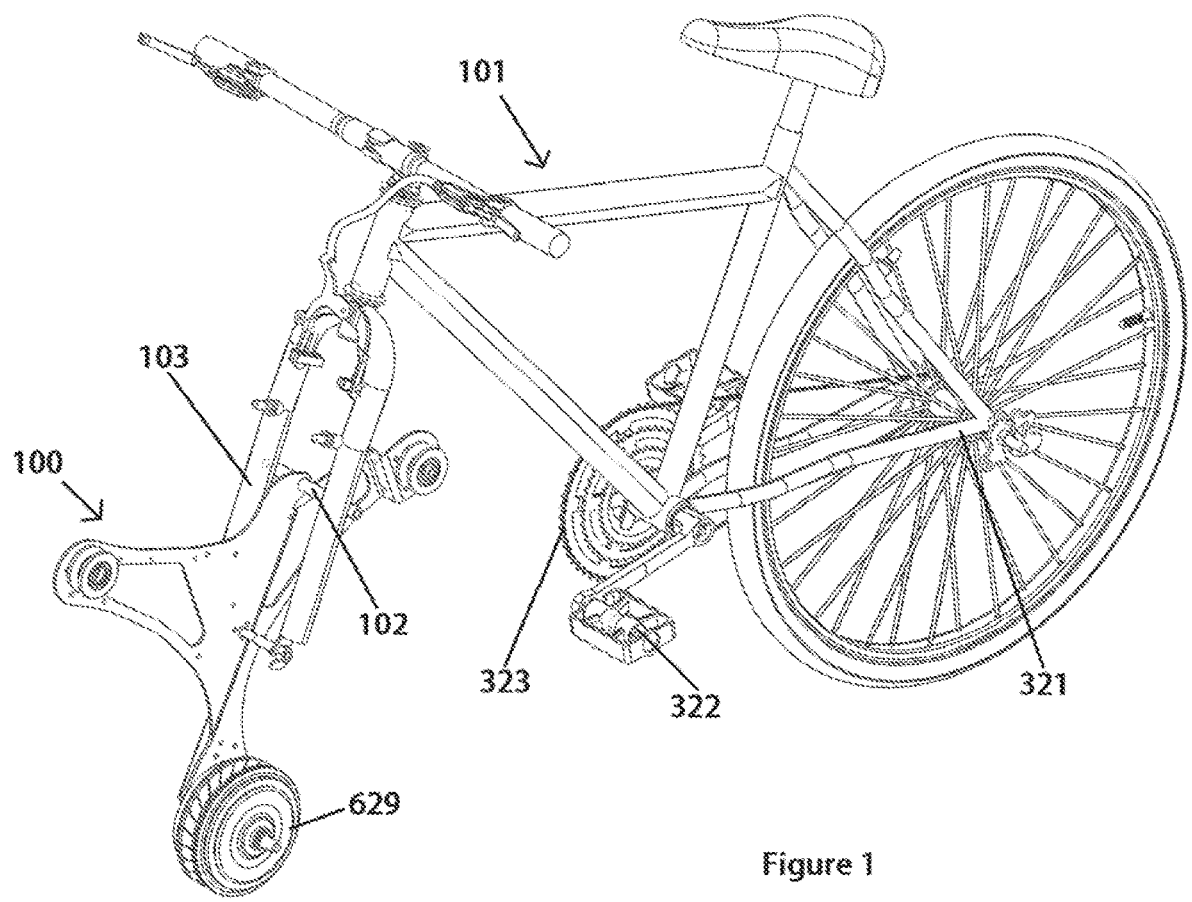
FIG. 1 shows an example of a wheel assembly with an alignment arm attached to a bicycle.

In order to ensure that the wheel assembly's orientation is correctly set, when installed on a vehicle, an embodiment of this disclosure utilizes an alignment arm to set its orientation. A specific orientation would be desired in an embodiment, for the wheel assembly to function as intended. FIG. 1 shows a wheel assembly 100 installed on a bicycle 101, further comprising an alignment arm 102 positioned away from the center of the wheel assembly. In this embodiment, said alignment arm is positioned such that it makes contact with the fork 103 of a bicycle on which said wheel assembly is installed. Said alignment arm is rigidly attached to the wheel assembly, and when installed on said bicycle it couples with said fork, thereby coupling the motion of the wheel assembly's structural body to the bicycle's fork. It will be clear that this concept can be applied to any kind of vehicle, not only to a bicycle.

The means for attaching said alignment arm to said vehicle may take many forms. In an embodiment, the attachment is through the use of a rubber strap attached to said alignment arm and wrapping around a bicycle's fork, coupling the two with a slightly flexible joint. Other means for attachment may include, but are not limited to, magnets, hook-and-loop fasteners, zip-ties, glue, snaps, screw clamps, set screws, clamps, welding, or even a second alignment arm which contacts the vehicle in another location to lock the wheel assembly's orientation.

In one embodiment, as shown in FIG. 1, it is desirable to orient the wheel such that the roller providing mechanical power from the motor within the wheel assembly is at the lowest point, closest to where the wheel assembly touches the ground. This is useful in order to utilize the weight of the vehicle it is installed on, and any user operating said vehicle, in pressing the motor against the rim of the wheel assembly, thereby increasing the quality of the mechanical coupling between them.

In another embodiment, it is desirable to orient the wheel such that a shock absorbing mechanism within the wheel assembly is located near the front of the vehicle, where an impact may occur with a street curb or wall. Said shock absorbing mechanism would support the rim and brace the wheel assembly against an impact. In an embodiment the planes of rotation of the one or more motors and the planes of rotations of the one or more rollers are essentially coinciding, which is referred to as "essential lateral alignment" of said one or more motors and said one or more rollers.

Figure 2:
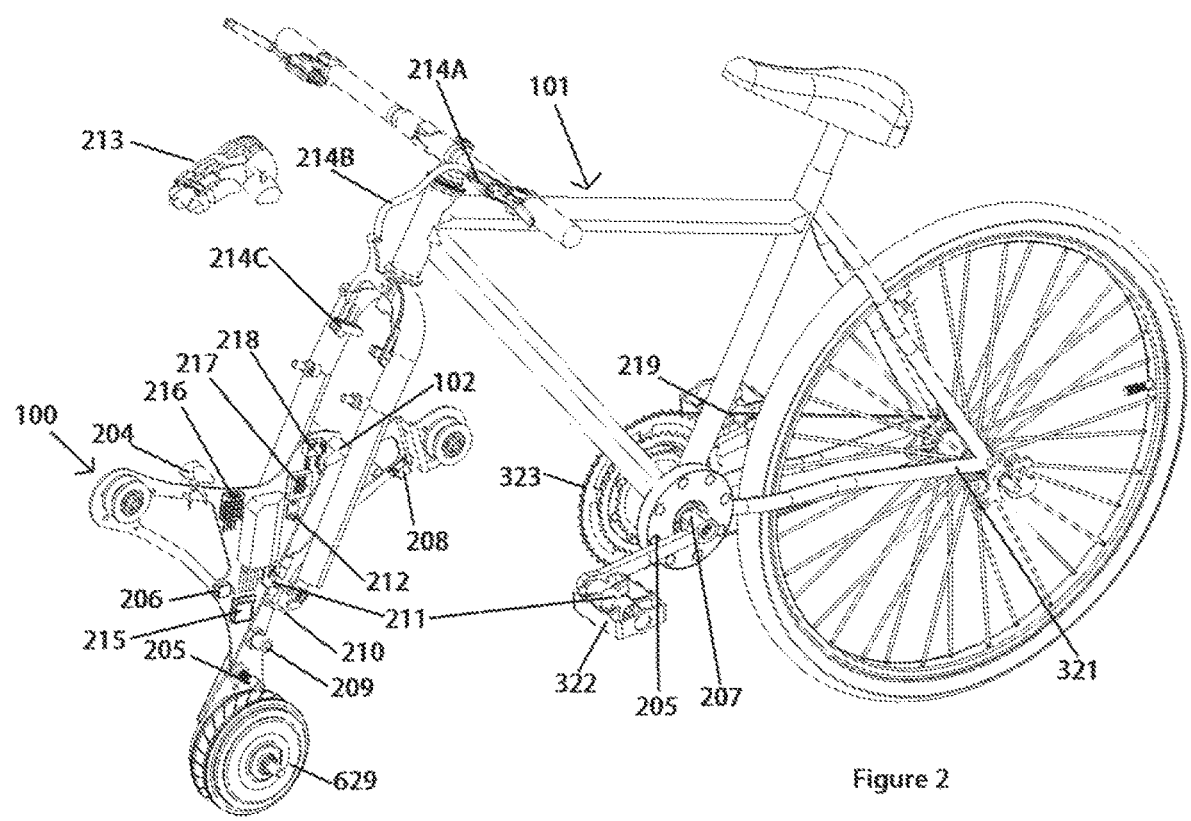
FIG. 2 shows an example of a wheel assembly with a number of different sensors.

In order to provide useful data to the user and allow for better control, some embodiments can include sensors with the wheel assembly to monitor user and/or environmental conditions. FIG. 2 shows a wheel assembly 100 further comprising one or more sensors such as a wind sensor 204, a cadence sensor 205, an inclinometer 206, a torque sensor 207, a tachometer 208, an accelerometer 209, an altimeter 210, a pressure sensor 211, a thermocouple 212, a biosensor 213, brake sensors 214A, 214B, 214C, a GPS sensor 215, an air quality sensor 216, a humidity sensor 217, a UV sensor 218, a tension sensor 219 or any number of additional sensors not listed here. Multiple sensors of a similar type could also be used to collect additional data.

In an embodiment some of these sensors can reside inside the wheel assembly itself, mounted directly to its components. Other sensors can be mounted on a vehicle on which a wheel assembly is installed, or on a user that is operating said wheel assembly.

In an embodiment the data from said sensors would be sent to a client or to a controller for a number of different purposes such as, but not limited to: improved wheel operation, improved vehicle user experience, safety, service and support purposes, traceability, logging etc. In an embodiment said client can be the motor controller on the wheel itself, in another embodiment it can be a client outside of the wheel such as a bike computer, smartphone, computer, server, cloud storage, or any other storage source that is not part of the wheel assembly itself. In different embodiments, the data is transferred from the sensors to said client by physical wires, or a wireless protocol such as, but not limited to, bluetooth, radio, wife, 2G, 3G, 4G, 5G, LTE, NFC, RFID, ANT.

In one embodiment, the data gathered from said sensors is used for tracking the use and conditions of a wheel residing within the vehicle. For example a cadence sensor(s), accelerometer(s), and/or GPS sensor(s) measure the total distance traveled, locations traveled, average speed and maximum speed. Inclinometer(s), accelerometer(s) and/or altimeter(s) measure inclination changes. Thermocouple(s) measure minimum, average and maximum temperatures of the wheel assembly's components such as the motor and battery. Accelerometers measure impacts to the wheel, such as riding over a pot-hole. Pressure sensor(s) measure the weight of the vehicle and user exerted onto the wheel assembly. This data is gathered and sent to the client. A user can than for instance review this data to see what the wheel assembly has encountered during use. If this wheel encounters a problem and needs repair, a technician can also review this data to help troubleshoot what may have caused the problem to occur.

In another embodiment, the data gathered from said sensors is used to measure the environment around the wheel and shared with a community of users to better plan the route they would like to take. A GPS sensor would be used to track location and map a specific route. This route is correlated with environmental sensors measuring air quality (pollution), air temperature, humidity and ultraviolet radiation (sunlight). This data is uploaded to a server and made available for users to see the condition of routes taken by themselves or other users.

In another embodiment, a wheel assembly is installed on a vehicle with pedals and has a throttle for a user to control the power applied to the motor within said wheel assembly. A cadence sensor and/or tachometer is used to determine if the pedals are turning, and power applied to the motor is cut off unless the pedals are moving.

In another embodiment, a wheel assembly is installed on a vehicle with pedals, and further comprises cadence sensor(s) and/or tachometer(s) used to determine if said pedals are turning, and at what speed they are turning. We will denote this rotational speed $\omega$. The power applied to a motor within said wheel assembly is defined by a formula $f(\omega)$, which is directly dependent upon the pedal's rotational speed, $\omega$.

In another embodiment, a wheel assembly is installed on a vehicle with pedals, and the force exerted by a user onto said pedals is measured through the use of pressure sensor(s) on said pedals. We will denote this pressure p. The power applied to a motor within said wheel assembly is defined by a formula $f(p)$, which is dependent upon the pressure on said pedals, p.

In another embodiment, a wheel assembly is installed on a vehicle with pedals, and the force exerted by a user onto said pedals is measured through the use of torque sensor(s) on said pedals. We will denote this torque $\tau$. The power applied to a motor within said wheel assembly is defined by a formula $f(\tau)$, which is dependent upon the torque on said pedals, $\tau$.

In another embodiment, a wheel assembly is installed on a vehicle with pedals and a chain or belt mechanically coupled to said pedals. The force exerted by a user onto said pedals is measured through the use of tension sensor(s) on said chain or belt. We will denote this tension T. The power applied to a motor within said wheel assembly is defined by a formula f(T), which is dependent upon the tension on said chain or belt, T.

Figure 3:
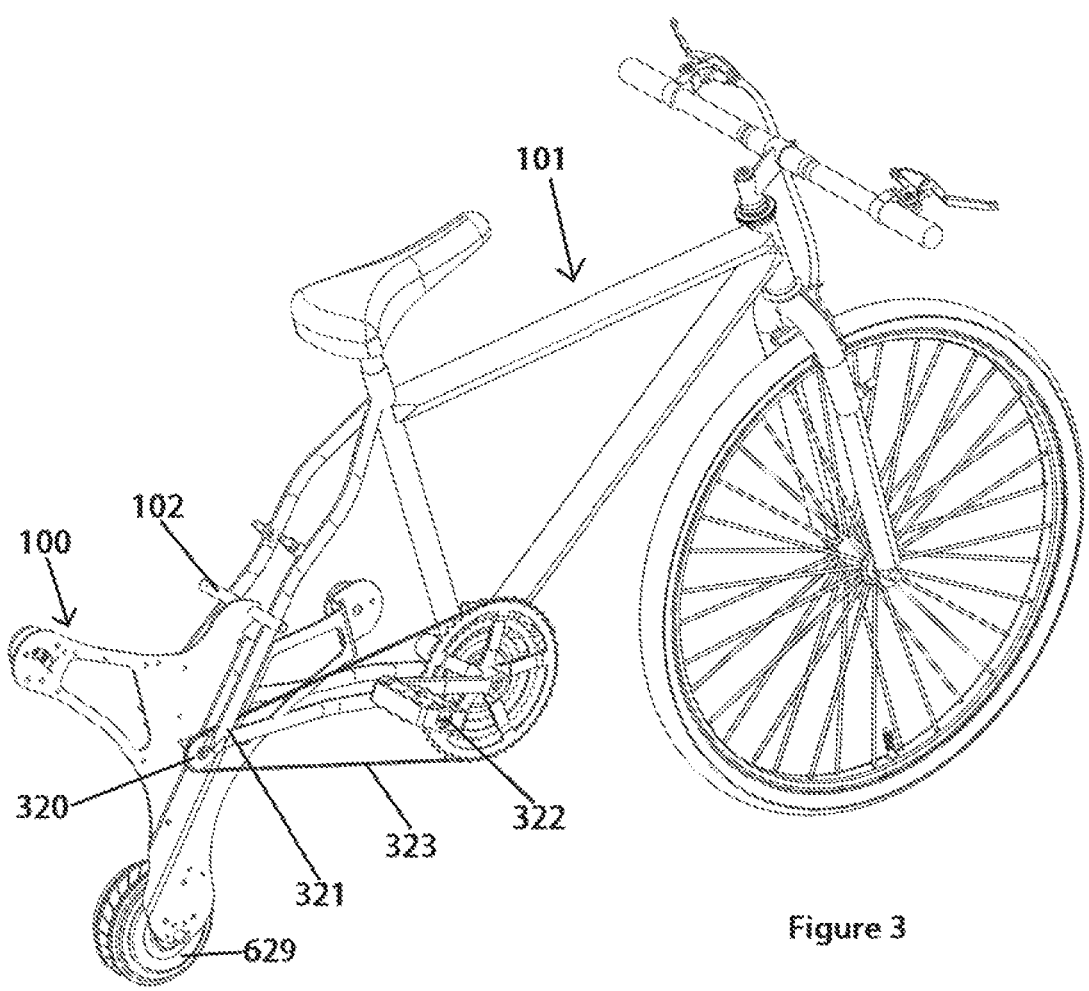
FIG. 3 shows an embodiment of a wheel assembly mounted on the rear fork of a bicycle.

When a wheel assembly is installed on a vehicle with pedals, in an embodiment said pedals are mechanically coupled to said wheel assembly so that a user can control the power to a motor comprised within said wheel assembly using said pedals, without the need to install any sensors on said pedals. FIG. 3 shows a wheel assembly 100, further comprising sensor(s) 320 mounted directly to said wheel assembly, and said wheel assembly is installed on the rear fork 321 of a bicycle 101 with pedals 322 and a chain or belt 323 mechanically coupled to said pedals. In this embodiment, said chain or belt is mechanically coupled to said sensor(s).

In one embodiment of this pedal coupled speed control, a wheel assembly further comprises sensor(s) in the form of cadence sensor(s) and/or tachometer(s) and is installed on a vehicle with pedals mechanically coupled to said sensor(s). Said sensor(s) are used to determine if said pedals are turning, and at what speed they are turning. We will denote this rotational speed $\omega$ dir. The power applied to a motor within said wheel assembly is defined by a formula f($\omega$ dir), which is directly dependent upon the pedal's rotational speed, $\omega$ dir.

In another embodiment of this pedal coupled speed control, a wheel assembly further comprises sensor(s) in the form of torque sensor(s), and is installed on a vehicle with pedals mechanically coupled to said sensor(s). Said sensor(s) are used to determine the force exerted by a user onto said pedals. We will denote this torque Tdir. The power applied to a motor within said wheel assembly is defined by a formula f(Tdir), which is dependent upon the torque on said pedals, Tdir.

In another embodiment, a wheel assembly is installed on a vehicle with pedals and further comprises inclinometer(s), altimeter(s) and/or accelerometer(s), which are used to determine if said wheel assembly is travelling up or down a hill and the instantaneous slope of said hill. We will denote this slope $\mathcal{M}$. The power applied to a motor within said wheel assembly is defined by a formula f($\mathcal{M}$), which is dependent upon said slope, $\mathcal{M}$.

In another embodiment, where a wheel assembly is installed on a vehicle, a wheel assembly further comprises pressure sensor(s), which are used to determine the force exerted onto said wheel assembly from said vehicle and/or any user(s) riding said vehicle. We will denote this weight W. The power applied to a motor within said wheel assembly is defined by a formula f(W), which is dependent upon said weight, W.

In another embodiment, a wheel assembly further comprises biosensor(s), which are used to measure signals from a user operating a wheel assembly. These signals include skin temperature, skin impedance, heart rate and/or muscle activation. We will denote these bio-signals B. The power applied to a motor within said wheel assembly is defined by a formula f(B), which is dependent upon said bio-signals, B.

In another embodiment, wind sensor(s) are used to measure the relative headwind coming at the front of the wheel assembly. We will denote this relative headwind HW. The power applied to a motor within said wheel assembly is defined by a formula f(HW), which is dependent upon said relative headwind, HW.

In another embodiment, the wheel assembly is installed on a vehicle with pedals, but no sensors are installed onto said pedals or any chain or belt coupled to said pedals. In this instance, the power exerted by a user onto said pedals is estimated using only sensors installed inside said wheel assembly itself. These sensors include laser tachometer(s) to measure the rotational speed of the pedals from inside said wheel assembly, cadence sensor(s) on the motor and/or rim inside said wheel assembly to determine the linear speed of travel, inclinometer(s) and/or altimeter(s) to measure if the wheel is ascending or descending, wind sensor(s) to measure relative wind speed and estimate wind resistance, and/or pressure sensor(s) to estimate the weight of said vehicle and said user. All available signals from said sensors are gathered into the wheel assembly's controller and used to estimate the power being exerted by said user. We will denote this power P. The power applied to a motor within said wheel assembly is defined by a formula f(P), which is dependent upon said estimated power exerted by said user, P.

In another embodiment, in which the wheel assembly is mounted on a vehicle equipped with pedals, said wheel assembly's controller will determine the required power it needs to apply to a motor within said wheel assembly to make said vehicle perform as if there were a simple free-spinning wheel (like a traditional spoked bicycle wheel with central bearings) installed on it instead of said wheel assembly. This "free-wheel" mode only provides power to said motor when it detected an external force was acting on the vehicle, such as a user providing force to said pedals, said vehicle descending down a hill, or another object pushing or pulling on said vehicle. This detection would be through to use of a cadence sensor on said motor or the rim of said wheel assembly. When motion is detected, said controller would calculate how a free-spinning wheel would react under the present conditions and provide an amount of power to said motor to obtain a similar reaction from said wheel assembly.

In another embodiment of this "free-wheel" mode as described above, said wheel assembly further comprises sensors to improve the calculation accuracy of said controller in predicting how said vehicle would react with a free-spinning wheel under the current conditions. These sensors include laser tachometer(s) to measure the rotational speed of the pedals from inside said wheel assembly, inclinometer(s) and/or altimeter(s) to measure if the wheel is ascending or descending, wind sensor(s) to measure relative wind speed and estimate wind resistance, and/or pressure sensor(s) to estimate the weight of said vehicle and said user.

In another embodiment, a wheel assembly further comprises humidity sensor(s), which are used to detect if the environment in which said wheel assembly is in, is above a predefined threshold of humidity. If this threshold is passed, settings within a controller comprised within said wheel assembly will change to improve safety of said wheel assembly. These settings include the maximum acceleration, maximum speed, maximum electric braking, and friction between a motor and a rim comprised within said wheel assembly.

In another embodiment, a wheel assembly is installed on a vehicle with pedals and further comprises air quality sensor(s), as well as a means for measuring the motion of said pedals. If said air quality sensor(s) detect that the quality of air measured is polluted beyond a predefined threshold, any power sent to a motor comprised within said wheel assembly based on signals from said means for measuring the motion of said pedals will be increased in an effort to reduce the amount of exertion of a user and thereby reduce the need to breath heavily said polluted air.

In another embodiment, the wheel assembly is installed on a vehicle with an existing braking mechanism. Brake sensor(s) are used to measure when a user intends to slow said vehicle, either by measuring a brake control directly, and/or by measuring the friction brake itself meant for slowing the wheel that said wheel assembly replaced. The sensor(s) measure or estimate the braking force that is applied by said user. We will denote this braking force Fb. The power applied to the electric motor within said wheel assembly is defined by a formula f(Fb). In this embodiment, said formula would apply an electrical braking force to said electric motor to slow said wheel assembly and said vehicle.

In another embodiment, the same electrical braking force as above is used, but the motor is designed such that as it removes mechanical energy from the system through braking, and converts a percentage of this into electrical energy and stores it into a battery.

The wheel assembly offers a user the use of a motor for locomotion and in the case of an electric motor, it also offers the option to slow the vehicle through electric braking. In order for a user to control the use of said motor, a speed control is needed to gather said user's input.

In one embodiment, the wheel assembly is equipped with a toggle-actuated speed control that simply directs a controller inside said wheel assembly to either apply no power, or maximum power to the motor within said wheel assembly. As an example: said toggle actuated speed control takes the form of either a lever, a switch, or a button, and stays in place in whichever position the user leaves it. This allows said user to set said toggle-actuated speed control in the position for maximum power and leave it there for a sort of cruise control.

In another embodiment, the wheel assembly is equipped with a toggle-actuated speed control that simply directs a controller inside said wheel assembly to either apply no power, or maximum power to the motor within said wheel assembly. As an example said toggle-actuated speed control takes the form of either a lever, a switch, or a button, and is spring loaded to return to the state where no power is applied to said motor unless said user continuously holds it in the state where maximum power is applied to said motor.

In another embodiment, the wheel assembly is equipped with an electric motor and a toggle-actuated speed control that simply directs a controller inside said wheel assembly to either apply no electric braking, or cause said electric motor to apply a braking force. As an example said toggle-actuated speed control takes the form of either a lever, a switch, or a button, and stays in place in whichever position the user leaves it. In this embodiment, another speed control for applying power to said motor to accelerate the vehicle would override said toggle-actuated speed control. The state in which said user leaves said toggle-actuated speed control would only take effect, either applying electric brake or not, when said other speed control was returned to it's default state of no acceleration.

In another embodiment, the wheel assembly is equipped with an electric motor and a toggle-actuated speed control that simply directs a controller inside said wheel assembly to either cause no electric braking, or cause said electric motor to apply a braking force. As an example said toggle-actuated speed control takes the form of either a lever, a switch, or a button, and is spring loaded to return to the state where no electric braking is applied to said motor unless said user continuously holds it in the state where electric braking is applied. In this embodiment, said toggle-actuated speed control would override any other speed controls present in said wheel assembly for applying power to said motor. If said user holds said toggle-actuated speed control in the position to apply electric braking, said wheel assembly would immediately apply said electric braking until said user releases said toggle-actuated speed control or said motor comes to a complete stop. In another embodiment the user would have to explicitly take another action in order to stop the electric braking.

In another embodiment, the wheel assembly is equipped with a variable speed control that directs a controller inside said wheel assembly to apply a range of power to a motor inside said wheel assembly. One end of this range would apply no power to said motor, while the other end would apply maximum power to said motor. As an example said variable speed control takes the form of a lever, a dial, a slide or a twist, and stays in place in whichever position the user leaves it. This allows said user to set said variable speed control in the position of their choosing and leave it there for a sort of cruise control.

In another embodiment, the wheel assembly is equipped with a variable speed control that directs a controller inside said wheel assembly to apply a range of power to a motor inside said wheel assembly. One end of this range would apply no power to said motor, while the other end would apply maximum power to said motor. As an example said variable speed control takes the form of a lever, a dial, a slide or a twist, and is spring loaded to return to the state where no power is applied to said motor.

In another embodiment, the wheel assembly is equipped with a variable speed control that directs a controller inside said wheel assembly to apply a range of power to a motor inside said wheel assembly. One end of this range would apply no power to said motor, while the other end would apply maximum power to said motor. Said variable speed control is a pressure sensor calibrated for the strength of a user's hand and applies power to said motor proportional to the pressure it measures from said user. If said user lets go of the sensor completely, no power will be applied to said motor.

In another embodiment, the wheel assembly is equipped with an electric motor and a variable speed control that directs a controller inside said wheel assembly to apply a range of power to said electric motor to apply a braking force. One end of this range would apply no electric braking, while the other end would apply maximum electric braking. As an example said variable speed control takes the form of a lever, a dial, a slide or a twist, and stays in place in whichever position the user leaves it. In this embodiment, another speed control for applying power to said motor to accelerate the vehicle would override said variable speed control. The state in which said user leaves said variable speed control would only take effect, either applying electric brake or not, when said other speed control was returned to it's default state of no acceleration.

In another embodiment, the wheel assembly is equipped with an electric motor and a variable speed control that directs a controller inside said wheel assembly to apply a range of power to said electric motor to apply a braking force. One end of this range would apply no electric braking while the other end would apply maximum electric braking. As an example said variable speed control takes the form of a lever, a dial, a slide or a twist, and is spring loaded to return to the state where no electric braking is applied to said motor unless said user continuously holds it in the state where electric braking is applied. In this embodiment, said variable speed control would override any other speed controls in said wheel assembly for applying power to said motor. If said user holds said variable speed control in the position to apply electric braking, said wheel assembly will immediately apply said electric braking until said user releases said variable speed control or said motor comes to a complete stop.

In another embodiment, the wheel assembly is equipped with an electric motor and a variable speed control that directs a controller inside said wheel assembly to apply a range of power to said electric motor to apply a braking force. One end of this range would apply no electric braking, while the other end would apply maximum electric braking. Said variable speed control is a pressure sensor calibrated for the strength of a user's hand and applies electric braking to said electric motor proportional to the pressure it measures from said user. If said user lets go of the sensor completely, no electric braking would be applied to said electric motor. In this embodiment, said variable speed control will override any other speed controls in said wheel assembly for applying power to said motor. If said user holds said variable speed control in the position to apply electric braking, said wheel assembly will immediately apply said electric braking until said user releases said variable speed control or said motor comes to a complete stop.

In another embodiment, the wheel assembly is equipped with an electric motor and a variable speed control that directs a controller inside said wheel assembly to apply either a range of electric braking to said electric motor, no power to said electric motor, or a range of power to said electric motor. Said variable speed control is spring loaded to return to a neutral position where no power is applied to said electric motor. From said neutral position a user can apply force in one direction to apply a range of electric braking to said electric motor from none up to the maximum level. From said neutral position said user can apply force in the opposite direction to apply a range of power to said electric motor from non up to the maximum level. As an example said variable speed control takes the form of a lever, a dial, a slide or a twist.

In another embodiment, the wheel assembly is equipped with an electric motor and a variable speed control that directs a controller inside said wheel assembly to apply either a range of electric braking to said electric motor, no power to said electric motor, or a range of power to said electric motor. Said variable speed control is a device worn by a user and detects signals from said user such as hand position, muscle activation or neural signals. Said signals are predefined to carry out specific actions of applying a range of electric braking or a range of power to said electric motor.

In another embodiment, the wheel assembly is equipped with an electric motor and a controller capable of communicating wirelessly with a smartphone. Said controller would take input from said smartphone to apply either a range of electric braking to said electric motor, no power to said electric motor, or a range of power to said electric motor. In this way, said smartphone acts as a variable speed control for said wheel assembly.

To help the wheel assembly be more easily installed on a vehicle, an embodiment has a speed control that can be quickly and easily installed onto said vehicle. In an embodiment said speed control can be installed without the use of tools and/or without making any modifications to said vehicle other than simply adding said speed control. Said speed control can have multiple degrees of freedom for adjusting the position of said speed control to better suit a user ergonomically.

Figure 4:
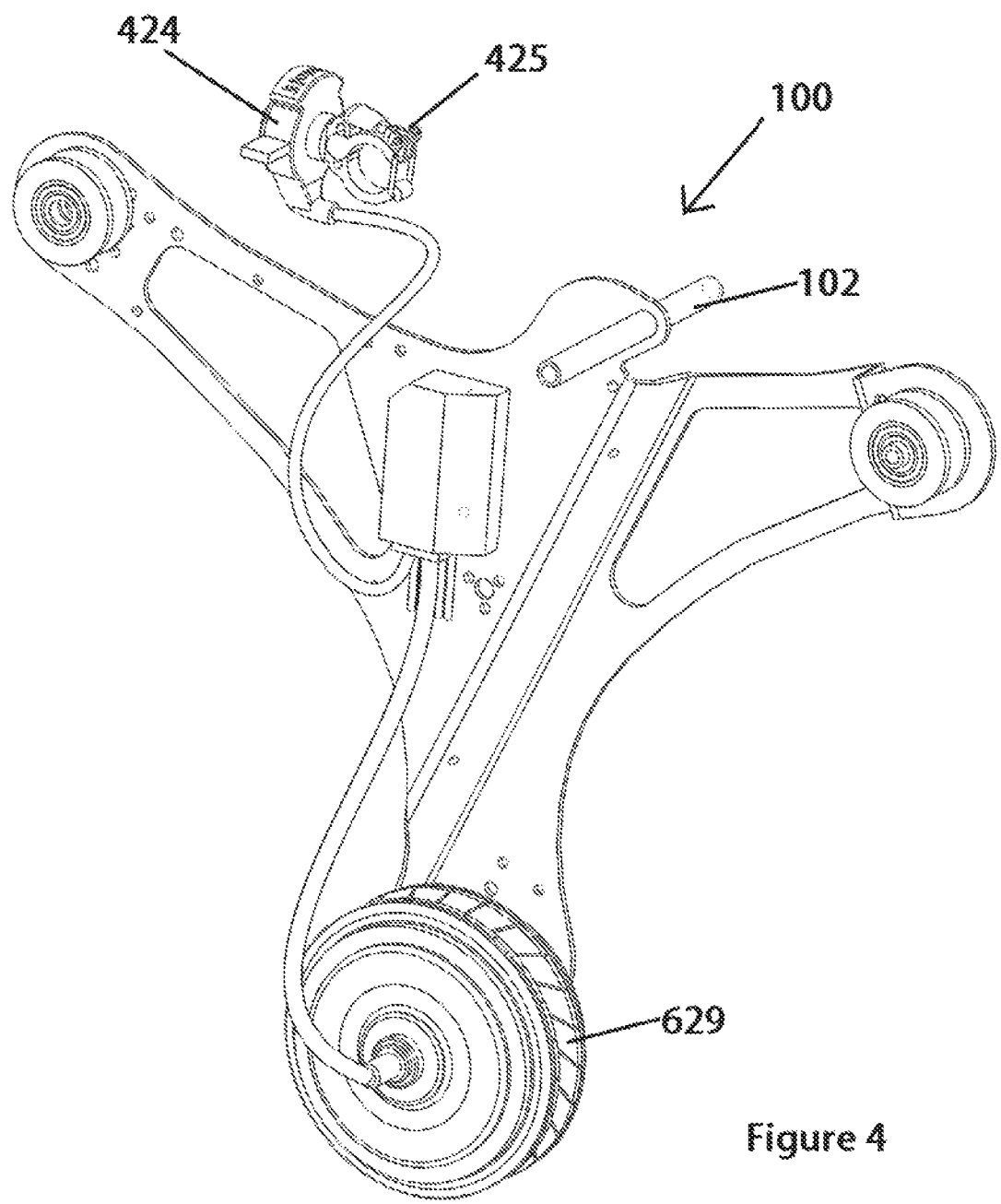
FIG. 4 shows an embodiment of a speed control that can be mounted by hand on a vehicle.

FIG. 4 shows one embodiment of said speed control 424 which can be attached by hand to said vehicle by means of a mechanical clamp 425. This particular embodiment is meant to attach to a round bar, such as a bicycle's handlebar.

Other embodiments for means of attaching said speed control to said vehicle can be used such as magnets, velcro, rubber straps, zip-ties, glue, snaps, screw clamps, set screws, or any other means of attachment without tools.

Since a wheel assembly comprising a controller will have many settings defined by said controller which affect the function of said wheel assembly, in an embodiment a user has access to change said settings. Said user-definable settings include, but are not limited to, maximum speed, maximum electric braking, maximum regenerative braking, maximum acceleration, tension on a rim within said wheel assembly and powered assistance in a "free wheel" state.

In one embodiment, a wheel assembly further comprising a controller with user-definable settings and a user interface allowing a user to alter said user-definable settings. Said user can use said user interface to adjust said user-definable settings.

In another embodiment, a wheel assembly further comprising a controller with user-definable settings, and said controller is equipped with a wired plug capable of plugging into a remote user interface. A user can use said remote user interface to adjust said user-definable settings.

In another embodiment, a wheel assembly further comprising a controller with user-definable settings, and said controller is able to communicate through a wireless protocol such as, but not limited to, bluetooth, radio, wife, 2G, 3G, 4G, 5G, LTE, NFC, RFID, ANT. A remote user interface such as a smartphone communicates with said controller using said wireless protocol, and allows a user to adjust said user-definable settings.

When the wheel assembly is installed onto a vehicle, in one embodiment there is an interface with said vehicle's existing brake system. For vehicles whose brakes make physical contact with the rim or tire of its wheels, it may not be necessary to make any changes to the brake system, since this same mechanism will make contact with the rim or tire of said wheel assembly as normal. In an embodiment additional sensors or controls are added for increased control though, for instance for applying regenerative braking using an electric motor inside said wheel assembly. Said regenerative braking provides a stopping force to said electric motor, and also generates electrical power within said electric motor, which is stored into a battery.

FIG. 2 shows a wheel assembly installed on a bicycle with various brake sensors installed. A brake lever sensor 214A is installed directly onto the existing brake lever of said bicycle and detects when said brake lever is actuated. A brake line sensor 214B is installed onto an existing brake line. In an embodiment said brake line sensor is a proximity sensor or tension sensor and detects when tension is put into said existing brake line. A brake pad sensor 214C is installed on an existing brake pad. In an embodiment said brake pad sensor is a proximity sensor or pressure sensor and detects when said existing brake pad moves to brake said vehicle. Other sensors or controls not listed here can also be used in order to interpret said user's desire or need to slow said vehicle.

In one embodiment of said brake sensors, a wheel assembly comprising an electric motor is installed on a vehicle and a brake lever sensor is installed on said vehicle's existing brake lever. Said brake lever sensor measures when said existing brake lever is actuated. In this embodiment, said brake lever sensor measures only if said existing brake lever moves, not the extent of movement. If there is no movement detected, then no braking force is applied to said electric motor. If movement is detected, then the maximum electric braking force is applied to said electric motor. If said brake lever sensor applies an electric braking force, it will override any speed control(s) currently applying power to said electric motor.

In another embodiment of said brake sensors, a wheel assembly comprising an electric motor is installed on a vehicle and a brake lever sensor is installed on said vehicle's existing brake lever. Said brake lever sensor measures when said existing brake lever is actuated. In this embodiment, said brake lever sensor measures a range from said existing brake lever based on either the distance said existing brake lever moves, or the force which is applied to said existing brake lever from a user. If there is no movement or force detected, then no braking force is applied to said electric motor. If movement or force is detected, then an electric braking force is applied to said electric motor proportional to the value measured by said brake lever sensor. If said brake lever sensor applies an electric braking force, it will override any speed control(s) currently applying power to said electric motor.

In another embodiment of said brake sensors, a wheel assembly comprising an electric motor is installed on a vehicle and a brake line sensor is installed on said vehicle's existing brake line. Said brake line sensor measures when said existing brake line is actuated. In this embodiment, said brake line sensor measures only if said existing brake line moves, not the extent of movement. If there is no movement detected, then no braking force is applied to said electric motor. If movement is detected, then the maximum electric braking force is applied to said electric motor. If said brake line sensor applies an electric braking force, it will override any speed control(s) currently applying power to said electric motor.

In another embodiment of said brake sensors, a wheel assembly comprising an electric motor is installed on a vehicle and a brake line sensor is installed on said vehicle's existing brake line. Said brake line sensor measures when said existing brake line is actuated. In this embodiment, said brake line sensor measures a range from said existing brake line based on either the distance said existing brake line moves, or the tension which is applied to said existing brake line from a user. If there is no movement or tension detected, then no braking force is applied to said electric motor. If movement or pressure is detected, then an electric braking force is applied to said electric motor proportional to the value measured by said brake line sensor. If said brake line sensor applies an electric braking force, it will override any speed control(s) currently applying power to said electric motor.

In another embodiment of said brake sensors, a wheel assembly comprising an electric motor is installed on a vehicle and a brake pad sensor is installed on said vehicle's existing brake pad. Said brake pad sensor measures when said existing brake pad is actuated. In this embodiment, said brake pad sensor measures only if said existing brake pad moves, not the extent of movement. If there is no movement detected, then no braking force is applied to said electric motor. If movement is detected, then the maximum electric braking force is applied to said electric motor. If said brake pad sensor applies an electric braking force, it will override any speed control(s) currently applying power to said electric motor.

In another embodiment of said brake sensors, a wheel assembly comprising an electric motor is installed on a vehicle and a brake pad sensor is installed on said vehicle's existing brakepad. Said brake pad sensor measures when said existing brake pad is actuated. In this embodiment, said brake pad sensor measures a range from said existing brake pad based on either the distance said existing brake pad moves, or the pressure which is applied by said existing brake pad. If there is no movement or pressure detected, then no braking force is applied to said electric motor. If movement or pressure is detected, then an electric braking force is applied to said electric motor proportional to the value measured by said brake pad sensor. If said brake pad sensor applies an electric braking force, it will override any speed control(s) currently applying power to said electric motor.

If a wheel assembly has no brake sensor information available, it may still be desired to apply electric braking when specific conditions are met. In one embodiment, a wheel assembly further comprising an electric motor and speed control has no brake sensors. When said speed control is activated and applies power to said electric motor, no electric braking is applied. When said speed control is released after activation, electric braking is automatically applied to said electric motor at a predefined amount. Said electric braking continues until said electric motor comes to a stop, drops below a predefined RPM speed, or until said speed control is activated again to apply power to said electric motor.

Figure 5:
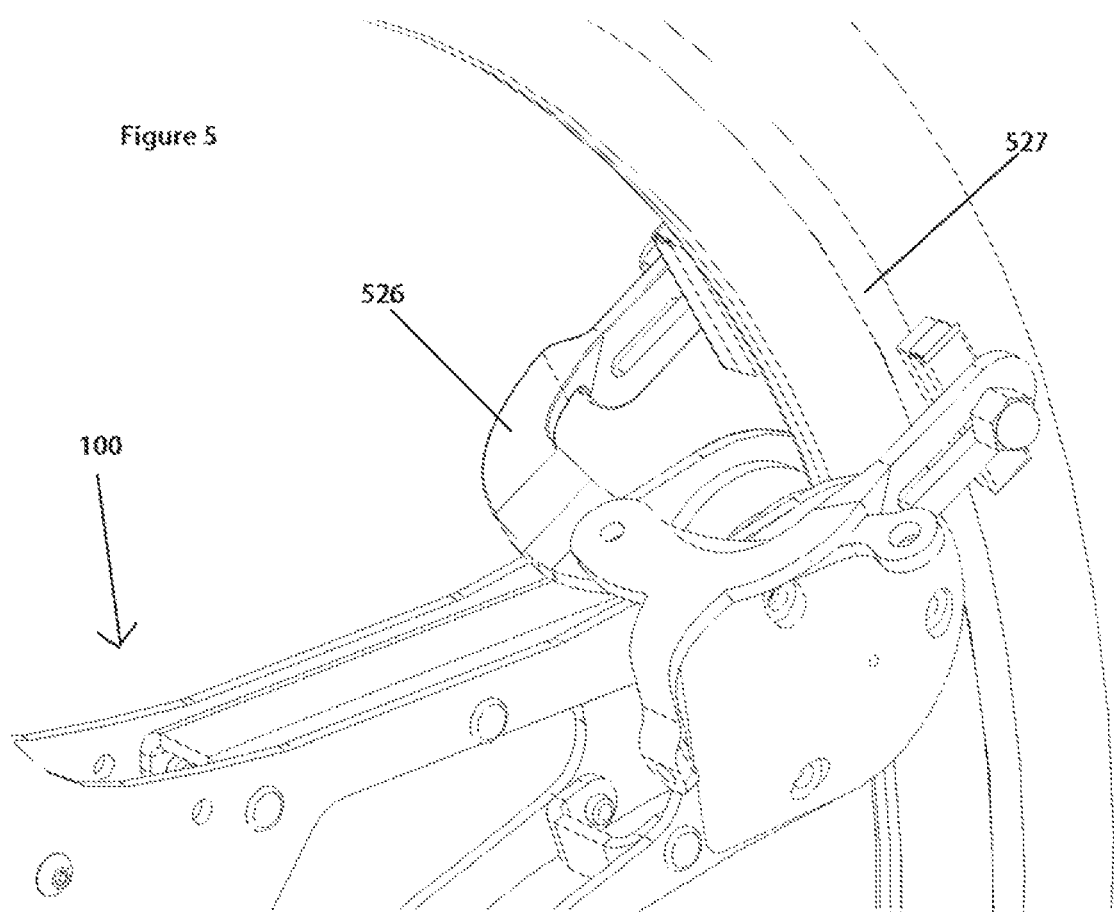
FIG. 5 shows an example of a wheel assembly with a friction brake and a rim.

In the case where a wheel assembly is installed on a vehicle and the vehicles existing brake system and/or electric braking within said wheel assembly does not supply the desired braking force, it may be desired to install a separate mechanical brake inside said wheel assembly itself. In an embodiment said friction brake is positioned to make contact with a rim or tire inside said wheel assembly, in another embodiment said friction brake makes contact with one or more rollers inside said wheel assembly. FIG. 5 shows a wheel assembly further comprising a friction brake 526 and a rim 527 with said friction brake positioned to make contact with said rim.

In one embodiment of a wheel assembly further comprising a friction brake, said wheel assembly is installed on a vehicle and there is a brake lever sensor installed on said vehicle's existing brake lever. Said friction brake is electrically actuated based on a signal from said brake lever sensor to apply a braking force to a rim, time or roller comprised in said wheel assembly. In this embodiment, said brake lever sensor measures a range from said existing brake lever based on either the distance said existing brake lever moves, or the force which is applied to said existing brake lever from a user. If there is no movement or force detected, then no braking force is applied by said friction brake. If movement or force is detected, then a braking force is applied by said friction brake proportional to the value measured by said brake lever sensor. If said brake lever sensor signals a braking force, it will override any speed control(s) currently applying power to any motors inside said wheel assembly.

In another embodiment of a wheel assembly further comprising a friction brake, said wheel assembly is installed on a vehicle and there is a brake line sensor installed on said vehicle's existing brake line. Said friction brake is electrically actuated based on a signal from said brake line sensor to apply a braking force to a rim, time or roller comprised in said wheel assembly. In this embodiment, said brake line sensor measures a range from said existing brake line based on either the distance said existing brake line moves, or the tension which is applied to said existing brake line from a user. If there is no movement or tension detected, then no braking force is applied by said friction brake. If movement or tension is detected, then a braking force is applied by said friction brake proportional to the value measured by said brake line sensor. If said brake line sensor signals a braking force, it will override any speed control(s) currently applying power to any motors inside said wheel assembly.

In another embodiment of a wheel assembly further comprising a friction brake, said wheel assembly is installed on a vehicle and there is a brake pad sensor installed on said vehicle's existing brake pad. Said friction brake is electrically actuated based on a signal from said brake pad sensor to apply a braking force to a rim, time or roller comprised in said wheel assembly. In an embodiment, said brake pad sensor measures a range from said existing brake pad based on the distance said existing brake pad moves, in another embodiment said brake pad sensor measures the pressure which is applied by said existing brake pad when actuated. If there is no movement or pressure detected, then no braking force is applied by said friction brake. If movement or pressure is detected, then a braking force is applied by said friction brake proportional to the value measured by said brake pad sensor. If said brake pad sensor signals a braking force, it will override any speed control(s) currently applying power to any motors inside said wheel assembly.

In another embodiment of a wheel assembly further comprising a friction brake, said wheel assembly is installed on a vehicle and there is a mechanical coupling between said friction brake and said vehicle's existing brake lever. This mechanical coupling is adjusted such that when a user actuates said existing brake lever, said friction brake also actuates to apply a braking force against a rim, tire or roller comprised in said wheel assembly.

In another embodiment of a wheel assembly further comprising a friction brake, said wheel assembly is installed on a vehicle and there is a mechanical coupling between said friction brake and said vehicle's existing brake line. This mechanical coupling is adjusted such that when a user actuates a brake on said vehicle and puts tension into said existing brake line, said friction brake also actuates to apply a braking force against a rim, tire or roller comprised in said wheel assembly.

In another embodiment of a wheel assembly further comprising a friction brake, said wheel assembly is installed on a vehicle and there is a mechanical coupling between said friction brake and said vehicle's existing brake pad. This mechanical coupling is adjusted such that when a user actuates a brake on said vehicle which actuates said existing brake pad, said friction brake also actuates to apply a braking force against a rim, tire or roller comprised in said wheel assembly.

In another embodiment of a wheel assembly further comprising a friction brake, said wheel assembly is installed on a bicycle with existing disc brake caliper(s) and there is a mechanical coupling between said friction brake and said vehicle's existing disc brake caliper(s). This mechanical coupling is adjusted such that when a user actuates a brake on said bicycle which actuates said existing disc brake caliper(s), said friction brake also actuates to apply a braking force against a rim, tire or roller comprised in said wheel assembly.

In the case of a wheel assembly being used on a bicycle with existing disc brake caliper(s), it may be desired to mount a brake disc to a roller comprised within said wheel assembly. In this embodiment said existing disc brake caliper(s) is positioned to apply a braking force on said brake disc.

Figure 6:
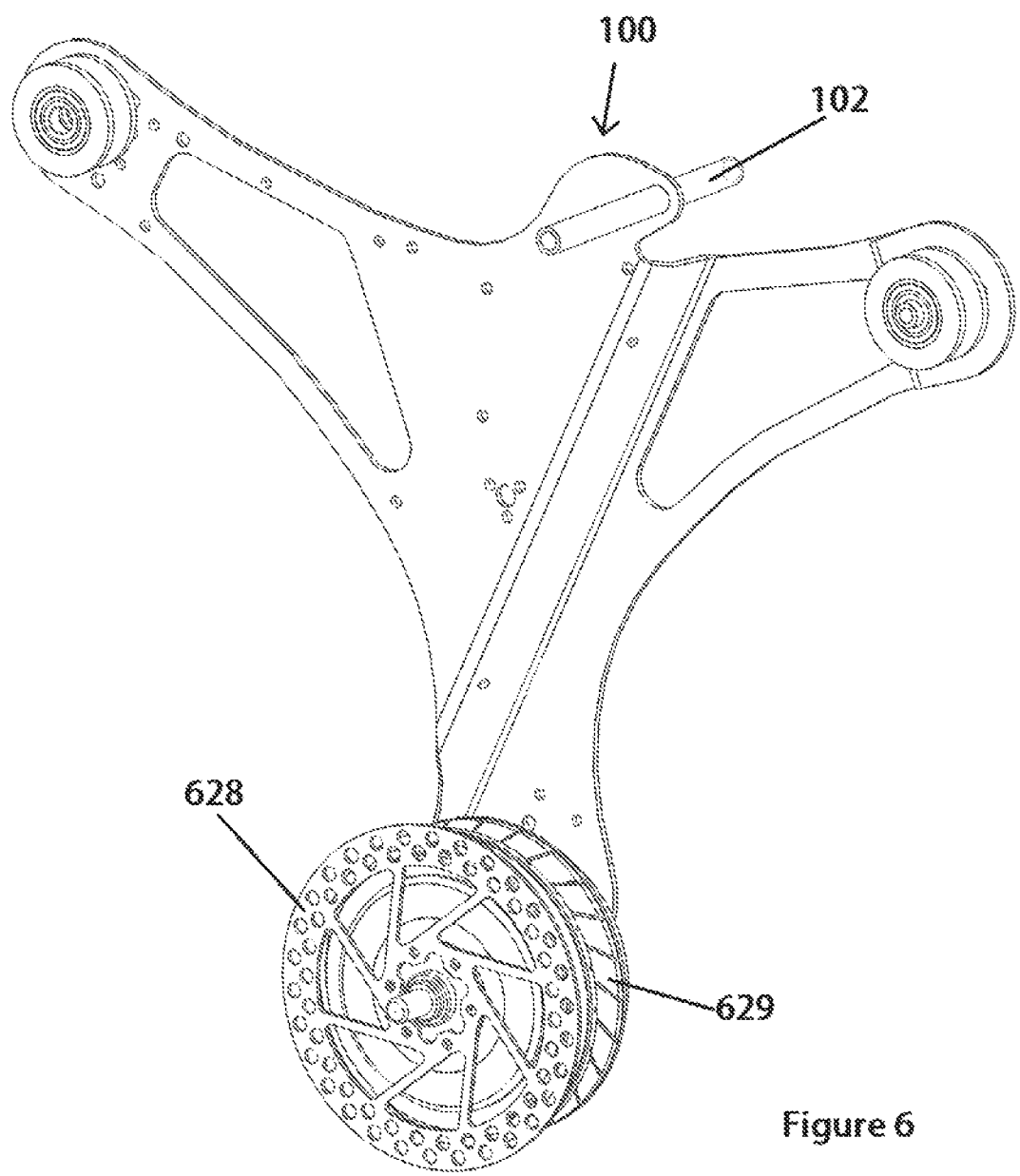
FIG. 6 shows an example of wheel assembly with a brake disc.

FIG. 6 shows a wheel assembly 100 further comprising a brake disc 628 installed directly onto the drive roller 629 of said wheel assembly where the motor of said wheel assembly applies its force. In an embodiment an existing disk brake caliper has been removed from its original location on a vehicle's fork and instead attached onto said wheel assembly such that it couples with said brake disc in a position to apply braking force to said brake disc when actuated. In this way, a user could actuate said vehicle's existing brake lever to actuate said existing brake caliper, which would apply a braking force to said brake disc, thereby slowing the wheel assembly and the vehicle.

In the case where a wheel assembly utilizes friction to translate force between a motor and rim comprised within said wheel assembly, one embodiment increases this friction by altering the surface of said rim.

In one embodiment of this altered surface rim, all or part of said rim is sanded or sand-blasted to have a rough texture.

In another embodiment of this altered surface rim, all or part of said rim is coated with a powder coating containing grit, to give a rough texture.

In another embodiment of this altered surface rim, all or part of said rim is coated with an adhesive containing grit, to give a rough texture.

In another embodiment of this altered surface rim, all or part of said rim is coated with a rubberized coating, to give a tacky texture.

Figure 7:
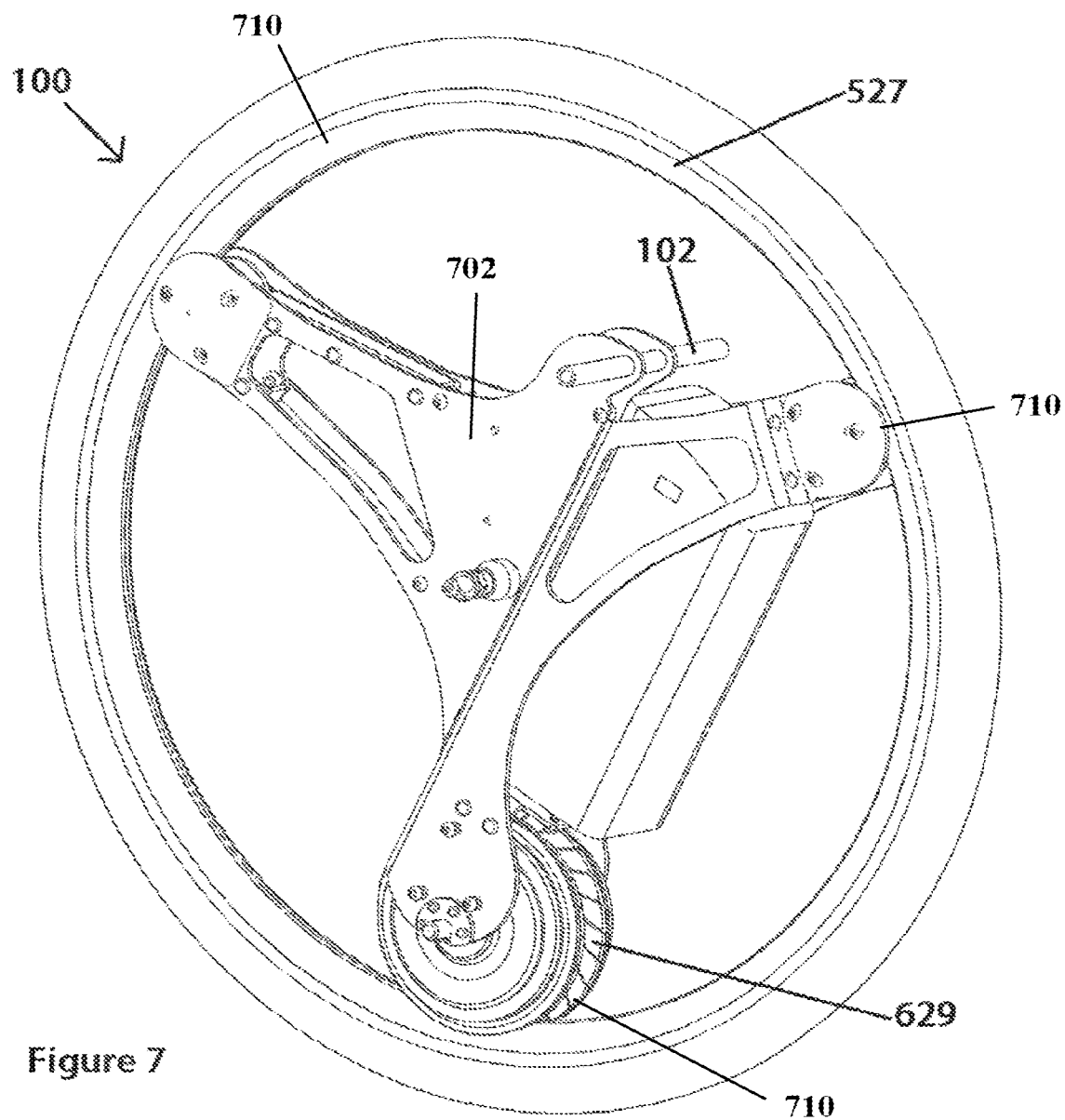
FIG. 7 shows an example of a wheel assembly with a rim without spoke holes.

In another embodiment, as shown in FIG. 7, a wheel assembly, further comprising a rim 527, can utilize a rim without spoke holes and/or without a hole for a valve stem. In this embodiment, said rim can be manufactured without the need for any holes in it, thereby increasing the strength of said rim and reducing manufacturing cost.

In some embodiments, the wheel assembly can include one or more hub plates 702, one or more rollers, one or more guide mechanisms 710, one or more motors, one or more brake discs, and a rim. The rollers can be rotatably mounted to the one or more hub plates 702. The guide mechanism 710 can include, be a part of, or correspond to at least one of a guide roller, a driver roller 629, a rim 527, or a portion of the hub plates 702. The guide mechanism 710 can facilitate or guide the rollers within the wheel assembly. The motors can powering at least one of the one or more rollers. At least one of the motors and at least one of the rollers can share a common axis of rotation and a common plate of rotation. The one or more brake discs can be mounted to the one or more motors. The rim can include a high friction surface and an axis of rotation. The high friction surface can be located such that it is rotatably coupled to the at least one of the rollers. The common axis of rotation may not substantially coincide with the axis of rotation of said rim. The friction brake can couple to the one or more brake disc.

Figure 8:
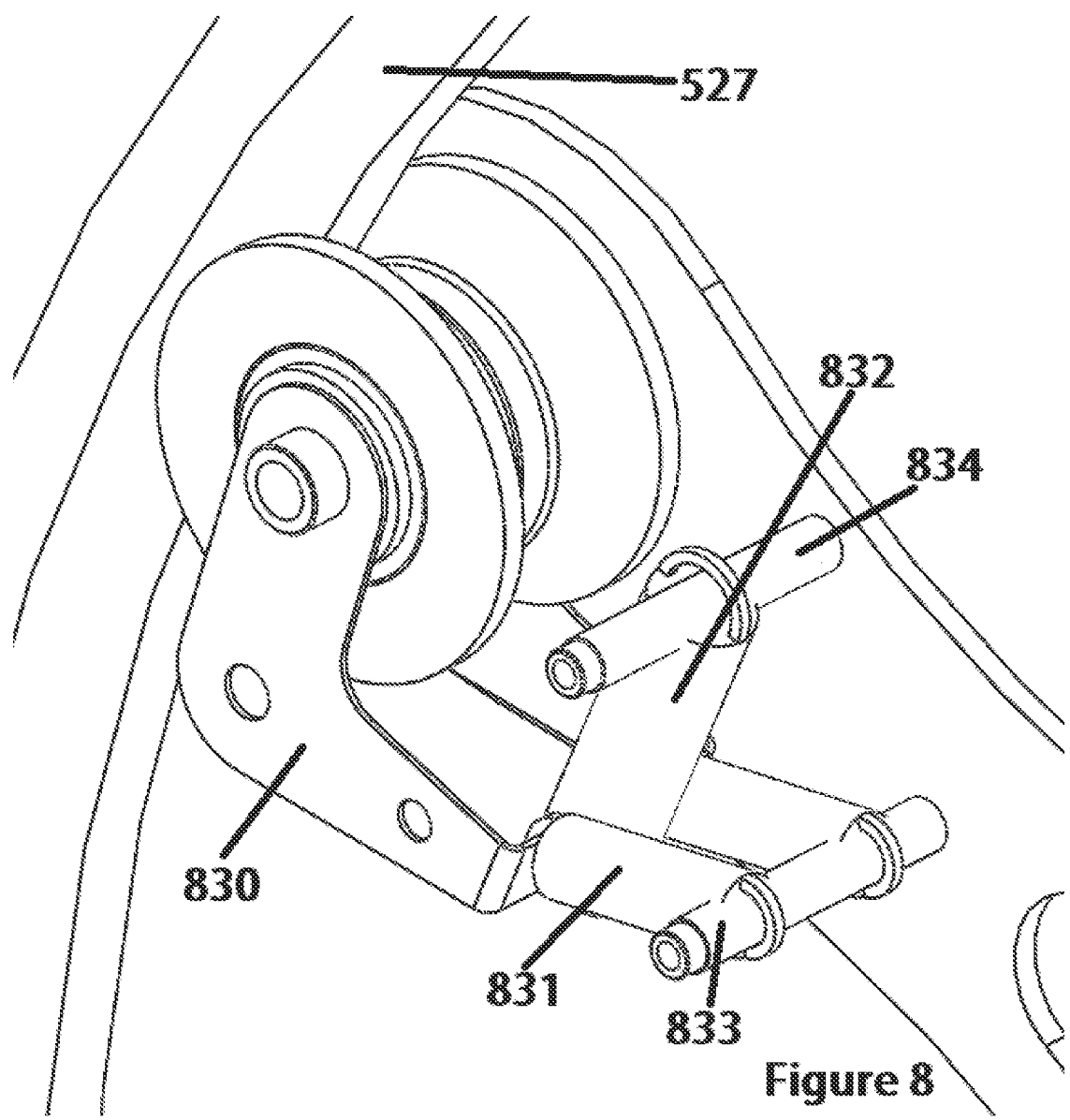
FIG. 8 shows an embodiment of a tensioner that serves as a shock absorber.

FIG. 8 shows an example guide roller with a means for shock absorbing. Such a shock absorber tensioner is useful when the wheel rim hits a road obstacle, such as a curb, or unevenness. The wheel rim can move back and forth, and the absorber will make sure that the wheel rim and guide roller remain in contact with one another, as the yoke 830 and spring loaded tensioner arms 831 and 832 pivot around their pivot points 833, 834. A possible other means for absorbing shocks consists of a hydraulic or pneumatic piston coupled to a guide roller. Yet another means for absorbing shocks consists of a simple piece of rubber mounted on the roller circumference or on the roller axle.

CONCLUSION, RAMIFICATIONS AND SCOPE

The reader will see that embodiments of this disclosure are beneficial in many ways, including, but not limited to: (a) reversibly converting legacy bicycles to electrically motorized bicycles in a very easy and inexpensive way, (b) using the stationary inside space of the wheel rim as productive space for mounting different components, including energy/power supplies, controllers, motors, rollers, suspension devices, storage spaces, communication and Internet of Things Connectivity devices, electronics, tools, and safety elements, such as lights, horns etc. (c) enabling inexpensive wheel manufacturing techniques, using off the shelf components, and less strict tolerances, while maintaining rider's comfort, (d) a variety of sensors to enhance safety, enhance the user experience, provide better serviceability, create a community experience.

What is claimed is:

1. A wheel assembly, said wheel assembly comprising:
one or more hub plates,
one or more rollers rotatably mounted to said one or more hub plates,
one or more guide mechanisms,
one or more motors, powering at least one of said one or more rollers, at least one of the one or more motors and the at least one of said one or more rollers sharing a common axis of rotation and a common plane of rotation,
wherein at least one of said one or more rollers is able to rotatably couple to a rim having an axis of rotation, and
wherein the common axis of rotation does not substantially coincide with the axis of rotation of said rim,
one or more sensors, selected from a group consisting of a wind speed sensor, an inclinometer, a pressure sensor, a torque sensor, a tachometer, an accelerometer, an altimeter, a thermocouple, a biosensor, a brake sensor, GPS sensors, a cadence sensor, a hall sensor, a humidity sensor, an air quality sensor, a UV sensor, a tension senor, wherein one or more said sensors are connected to a controller for adjusting the power that is applied to the one or more said motors, the controller configured to determine power being exerted by a user with the wheel assembly mounted on a vehicle, and
wherein the controller is configured to adjust the power that is applied by the one or more said motors based on the power being exerted by the user.

2. A wheel assembly as claimed in claim 1, said wheel assembly further comprising:
one or more controllers, said controllers electrically coupled to said one or more motors, and said controllers capable of regulating the power input to said motors,
said one or more controllers configured to offset the inherent resistance of the assembly.

3. A wheel assembly as claimed in claim 1 said wheel assembly further comprising:
one or more clip on speed controls.

4. A wheel assembly as claimed in claim 3, wherein the one or more clip on speed controls includes a throttle-brake combination.

5. A wheel assembly as claimed in claim 1, wherein one or more said sensors are used to optimize the operation of the wheel for different environmental conditions.

6. A wheel assembly as claimed in claim 1, wherein one or more said sensors are connected to a client to communicate environmental conditions to said client.

7. A wheel assembly as claimed in claim 1, wherein one or more said sensors are connected to a client used to communicate wheel operational conditions to said client.

8. A wheel assembly as claimed in claim 1, wherein the controller is configured to estimate power being exerted by a user with the wheel assembly mounted on a vehicle, and
wherein the controller is configured to adjust the power that is applied by the one or more said motors based on the estimated power being exerted by the user.

9. A wheel assembly, said wheel assembly comprising:
one or more hub plates,
one or more rollers rotatably mounted to said one or more hub plates,
one or more guide mechanisms,
one or more motors, powering at least one of said one or more rollers, at least one of the one or more motors and the at least one of said one or more rollers sharing a common axis of rotation and a common plane of rotation,
one or more brake discs that are mounted to said one or more motors,
wherein at least one of said one or more rollers is able to rotatably couple to a rim having an axis of rotation,
wherein the common axis of rotation does not substantially coincide with the axis of rotation of said rim,
a friction brake, and
wherein said friction brake couples to said one or more brake discs.

10. A wheel assembly as claimed in claim 9, said wheel assembly further comprising:
one or more clip on speed controls.

11. A wheel assembly as claimed in claim 10, wherein the one or more clip on speed controls includes a throttle-brake combination.

12. A wheel assembly, said wheel assembly comprising:
one or more hub plates,
one or more rollers rotatably mounted to said one or more hub plates,
one or more guide mechanisms,
one or more motors, powering at least one of said one or more rollers, at least one of the one or more motors and the at least one of said one or more rollers sharing a common axis of rotation and a common plane of rotation,
one or more brake discs that are mounted to said one or more motors,
a rim having a high friction surface and an axis of rotation, the high friction surface being located such that it is rotatably coupled to the at least one of said one or more rollers;
wherein the common axis of rotation does not substantially coincide with the axis of rotation of said rim, and
wherein said friction brake couples to said one or more brake discs.

13. A wheel assembly as claimed in claim 12, wherein said one or more rollers includes a drive roller powered by the motors;
wherein the drive roller is configured to engage a region of the rim at which the high friction surface is located;
wherein the high friction surface includes a rough texture resulting from an approach selected from a group consisting of: sanding the region of the rim; and sand-blasting the region of the rim.

14. A wheel assembly as claimed in claim 12, wherein said one or more rollers includes a drive roller powered by the motors;

wherein the drive roller is configured to engage a region of the rim at which the high friction surface is located;

wherein the high friction surface includes a rough texture resulting from an approach selected from a group consisting of: applying a powder coating containing grit to the region of the rim; and applying an adhesive containing grit to the region of the rim.

15. A wheel assembly as claimed in claim 12, wherein said one or more rollers includes a drive roller powered by the motors;

wherein the drive roller is configured to engage a region of the rim at which the high friction surface is located;

wherein the high friction surface includes a tacky texture resulting from an application of a rubberized coating to the region.

16. A wheel assembly as claimed in claim 12, said wheel assembly further comprising:

one or more clip on speed controls.

17. A wheel assembly as claimed in claim 16, wherein the one or more clip on speed controls includes a throttle-brake combination.

\* \* \* \* \*